(12) United States Patent
Faubert et al.

(10) Patent No.: US 10,865,712 B2
(45) Date of Patent: Dec. 15, 2020

(54) VALVE ASSEMBLY WITH OIL SHUT-OFF VALVE

(71) Applicant: PRATT & WHITNEY CANADA CORP., Longueuil (CA)

(72) Inventors: Charles Faubert, Longueuil (CA); Johnny Vinski, Châteauguay (CA); Valeri Soukhostavets, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 70 days.

(21) Appl. No.: 15/990,743

(22) Filed: May 28, 2018

(65) Prior Publication Data

US 2018/0274444 A1    Sep. 27, 2018

Related U.S. Application Data

(62) Division of application No. 14/743,258, filed on Jun. 18, 2015, now Pat. No. 10,001,060.

(51) Int. Cl.
| | |
|---|---|
| *F02C 7/06* | (2006.01) |
| *F16K 3/02* | (2006.01) |
| *F16K 11/07* | (2006.01) |
| *F16K 17/02* | (2006.01) |
| *F16K 31/12* | (2006.01) |
| *F16K 3/32* | (2006.01) |
| *F16K 31/122* | (2006.01) |
| *F16K 3/26* | (2006.01) |

(52) U.S. Cl.
CPC ............. *F02C 7/06* (2013.01); *F16K 3/029* (2013.01); *F16K 3/26* (2013.01); *F16K 3/32* (2013.01); *F16K 17/02* (2013.01); *F16K 31/12* (2013.01); *F16K 31/1221* (2013.01); *F16K 31/1225* (2013.01); *F16K 31/1226* (2013.01)

(58) Field of Classification Search
CPC . F02C 7/06; F16K 3/029; F01D 9/065; F01D 25/18; F04D 25/0626; F04D 25/062
USPC ........ 137/115.13–115.16, 115.28, 489, 492.5
See application file for complete search history.

(56) References Cited

U.S. PATENT DOCUMENTS

| | | |
|---|---|---|
| 1,566,995 A | 12/1925 | Standerwick |
| 3,687,160 A | 8/1972 | Erickson et al. |
| 4,245,465 A * | 1/1981 | Milo ........................ F16N 27/00 184/6.11 |

(Continued)

*Primary Examiner* — Paul J Gray
(74) *Attorney, Agent, or Firm* — Norton Rose Fulbright Canada LLP

(57) ABSTRACT

A gas turbine engine valve assembly having an oil shut-off valve and a compensating valve fluidly connected thereto. The compensating valve, in a first position, restricts access to a pressure-reducing oil flow path leading to an oil reservoir, and in a second position, provides access to the pressure-reducing oil flow path. The pressure-reducing oil flow path is defined by fluid flow between housing apertures, a laminar hole and an orifice. The valve assembly is operable between a first configuration, wherein the oil shut-off valve is in a fluid transfer position and a piston of the compensating valve is in a closed position to direct oil toward the engine component, and a second configuration, wherein the oil shut-off valve is in the shut-off position and the piston is in a open position to direct oil toward the oil reservoir via the pressure-reducing oil flow path.

6 Claims, 6 Drawing Sheets

(56) References Cited

U.S. PATENT DOCUMENTS

| | | | |
|---|---|---|---|
| 5,636,708 A * | 6/1997 | Wedeven | C10M 171/005 |
| | | | 184/104.1 |
| 5,762,134 A | 6/1998 | Droste et al. | |
| 5,890,509 A | 4/1999 | Becker et al. | |
| 8,578,967 B2 | 11/2013 | Vinski et al. | |
| 2013/0011263 A1 | 1/2013 | Subramaniam et al. | |

* cited by examiner

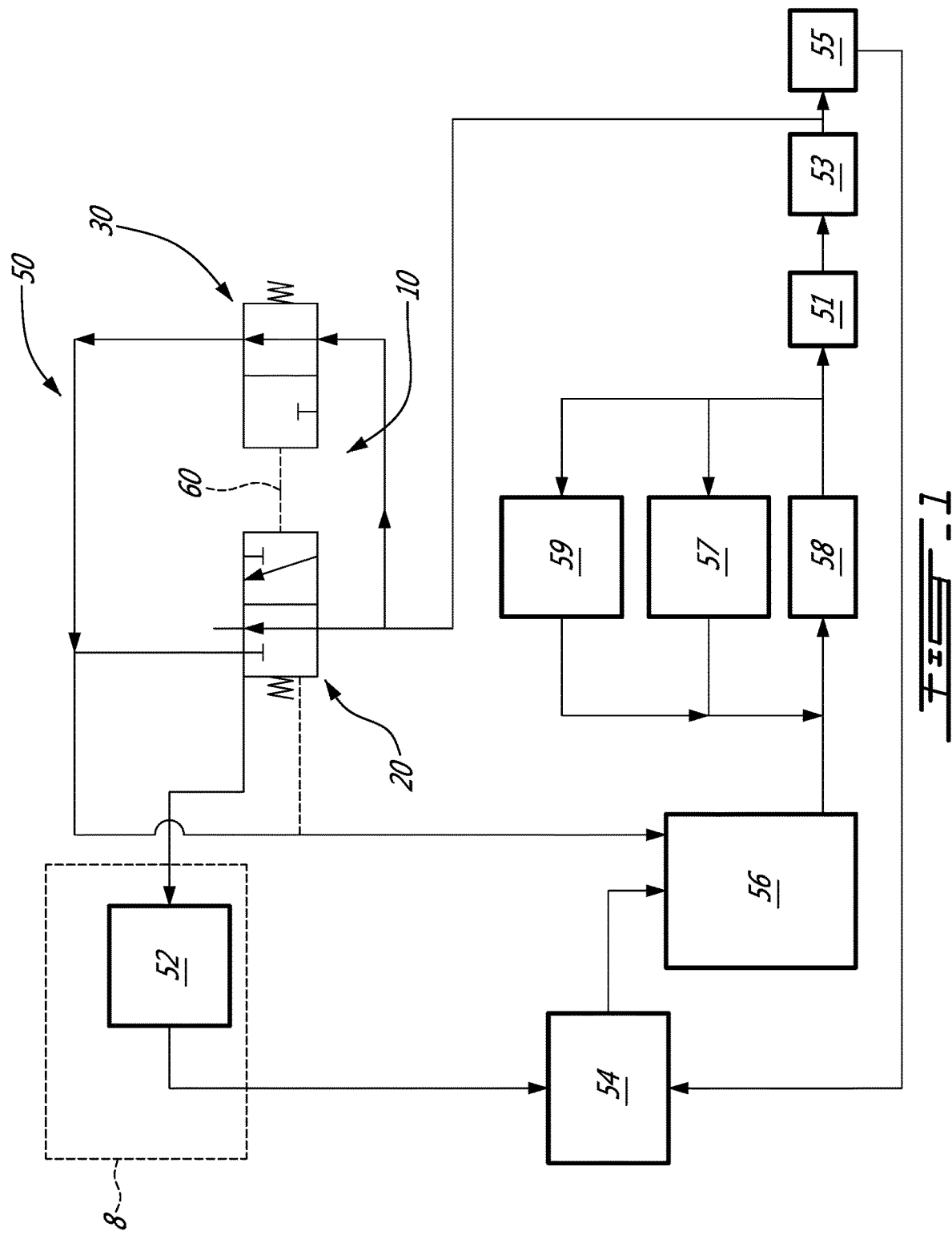

VALVE ASSEMBLY WITH OIL SHUT-OFF VALVE

CROSS-REFERENCE TO RELATED APPLICATIONS

This application is a divisional of U.S. patent application Ser. No. 14/743,258 filed on Jun. 18, 2015, the entire contents of which are incorporated herein by reference.

TECHNICAL FIELD

The application relates generally to oil systems for gas turbine engines and, more particularly, to a valve assembly for such oil systems having an oil shut-off valve.

BACKGROUND

In gas turbine engine oil systems, an oil shut-off valve (OSOV) is typically used to terminate a flow of oil through the oil system. This may be desirable, for example, at engine shutdown in order to avoid flooding the bearings supporting the rotating elements of the gas turbine engine. An oil shut-off valve may also be used to enable the parts downstream of the valve to be certified as fire resistant instead of fire proof.

Some OSOVs are actuated by pressurized air, which can be bled off from the high pressure (HP) compressor of the gas turbine engine. The HP spool (i.e. the HP compressor and the HP turbine) drives the pumps used to scavenge oil and to supply oil to the bearings. At a certain pressure, the pressurized air opens and closes the OSOV. The air system must be sealed from the oil system. When this seal malfunctions it may provide a path for the oil to contaminate the air system and vice-versa.

SUMMARY

In one aspect, there is provided a valve assembly of an oil system for a gas turbine engine, comprising: an oil shut-off valve operating between a fluid transfer position to direct oil toward an engine component to be lubricated, and a shut-off position to block the flow of oil toward the engine component; and a compensating valve fluidly connected to the oil shut-off valve and displaceable between first and second positions, the compensating valve in the first position restricting access to a pressure-reducing oil flow path leading to an oil reservoir, and the compensating valve in the second position providing access to the pressure-reducing oil flow path toward the oil reservoir, the compensating valve comprising: a housing defining a central axis, the housing having a plurality of spaced apart housing apertures disposed about a periphery of the housing; a piston disposed within the housing and displaceable relative to the housing between an open position and a closed position, the piston exposing the housing apertures in the open position and the piston blocking the housing apertures in the closed position; a laminar hole and an orifice, the laminar hole extending through one of the piston and the housing, and the orifice extending through the other one of the piston and housing; and the pressure-reducing oil flow path defined by fluid flow between the housing apertures, the laminar hole, and the orifice; the valve assembly operable between a first configuration and a second configuration, the oil shut-off valve being in the fluid transfer position and the piston being in the closed position to direct oil toward the engine component in the first configuration, the oil shut-off valve being in the shut-off position and the piston being in the open position to direct oil toward the oil reservoir via the pressure-reducing oil flow path in the second configuration.

In another aspect, there is provided an oil system of a gas turbine engine having bearing cavities lubricated by the oil system, the oil system comprising: an oil reservoir; one or more scavenge pumps in fluid communication with the bearing cavities of the gas turbine engine and the oil reservoir, the scavenge pumps collecting and directing used oil from the bearing cavities into the oil reservoir; a supply pump providing oil flow from the oil reservoir toward one or more components of the gas turbine engine, including the bearing cavities; a valve assembly downstream of the supply pump and upstream of the bearing cavities, the valve assembly operable between a first configuration to direct oil toward the bearing cavities and a second configuration to block the flow of oil toward the bearing cavities, the valve assembly including: an oil shut-off valve operating between a fluid transfer position and a shut-off position; and a compensating valve fluidly connected to the oil shut-off valve and displaceable between first and second positions, the compensating valve in the first position restricting access to a pressure-reducing oil flow path leading to the one or more scavenge pumps and the compensating valve in the second position providing access to the pressure-reducing oil flow path leading toward the oil reservoir, the compensating valve comprising a housing having a plurality of spaced apart housing apertures disposed about a periphery of the housing, a piston disposed within the housing and displaceable relative to the housing between an open position and a closed position, the piston exposing the housing apertures in the open position and the piston blocking the housing apertures in the closed position, and laminar hole and an orifice, the laminar hole extending through one of the piston and the housing, and the orifice extending through the other one of the piston and housing, the pressure-reducing oil flow path defined by fluid flow between the housing apertures, the laminar hole, and the orifice; wherein in the first configuration of the valve assembly the oil shut-off valve is in the fluid transfer position and the piston of the compensating valve is in the closed position, and in the second configuration of the valve assembly the oil shut-off valve is in the shut-off position and the piston of the compensating valve is in the open position.

In another aspect, there is further provided a method of managing a flow of oil to a component of a gas turbine engine, comprising: conveying the flow of oil simultaneously towards an oil shut-off valve and a compensating valve; bypassing the flow of oil from the component by at least closing the oil shut-off valve to direct oil towards an oil reservoir via the compensating valve; and directing the flow of oil towards the component via the oil shut-off valve by closing the compensating valve and opening the oil shut-off valve.

There is also provided, in a further aspect, a valve assembly of an oil system for a gas turbine engine, comprising: an oil shut-off valve operating between an open position to direct oil toward an engine component to be lubricated when a pressure of the oil exceeds a threshold oil pressure, and a closed position to block the flow of oil toward the engine component when the pressure of the oil is below the threshold oil pressure, the threshold oil pressure being a function of a main oil temperature (MOT) and a speed (Ng) of a gas generator of the gas turbine engine; and a compensating valve fluidly connected to the oil shut-off valve and directing oil to an oil reservoir along a pressure-reducing oil flow path when the temperature of the oil is below the MOT, thereby reducing the pressure of the oil provided to the oil shut-off valve.

BRIEF DESCRIPTION OF THE DRAWINGS

Reference is now made to the accompanying figures in which:

FIG. 1 is a schematic view of an oil system of a gas turbine engine, according to an embodiment of the present disclosure;

DETAILED DESCRIPTION

Figure 2A:
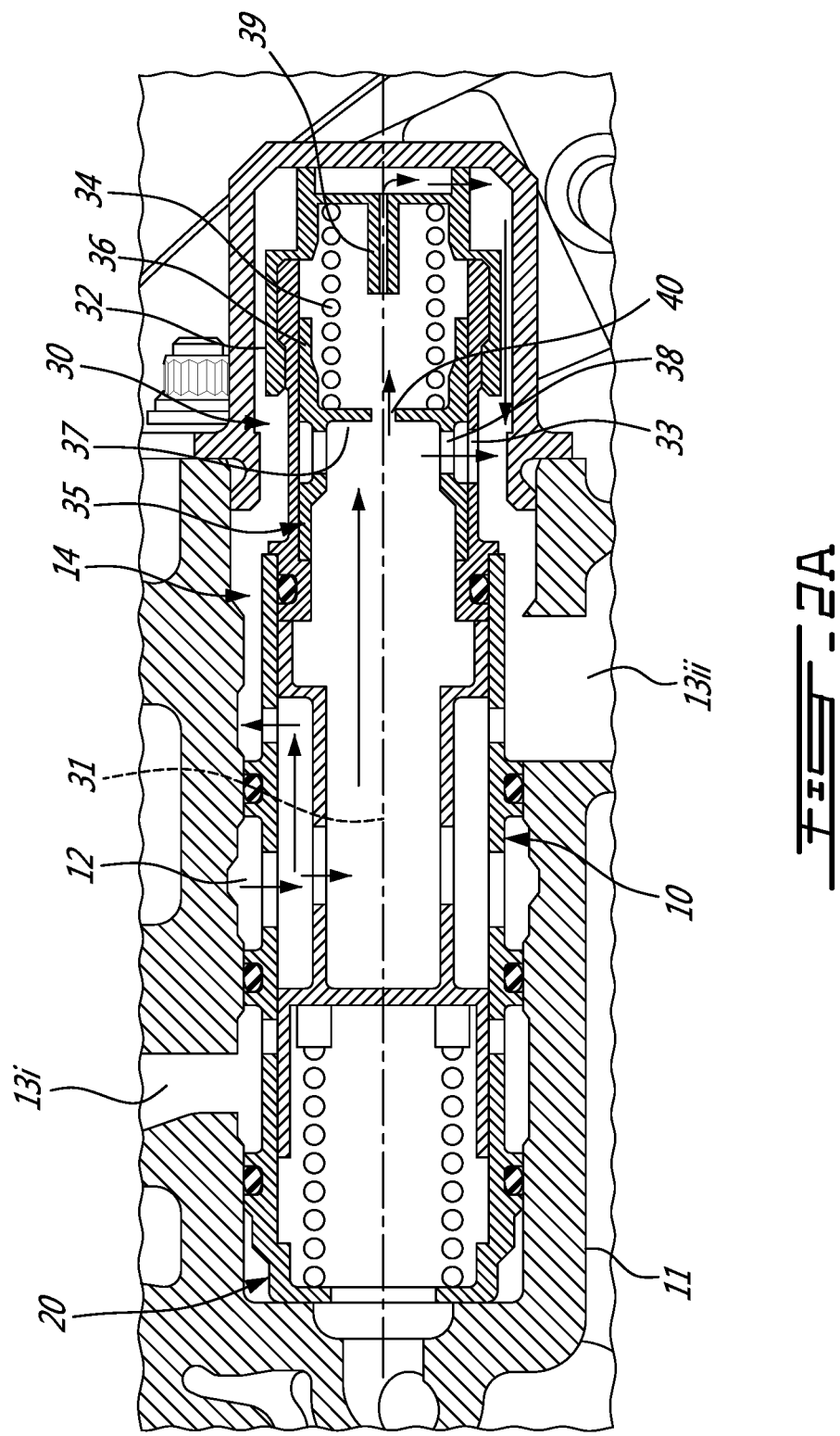
FIG. 2A is a cross sectional view of a valve assembly of the oil system of FIG. 1, with an oil shut-off valve being shown in a shut-off position and a compensating valve being shown in an open position.

FIG. 1 illustrates an oil system 50 for a gas turbine engine 8. The oil system 50 provides lubrication for the rotating components of the gas turbine engine 8. These components include the bearings 52 for the rotating turbomachinery (i.e. the compressors, turbines, shafts, and gears). Once the oil has been used by the bearings 52, it is reclaimed by scavenge pumps 54 which pump the oil to an oil reservoir 56 or tank. From the reservoir 56, the oil can be pumped with a supply pump 58. The supply pump 58 can have, or communicate with, other components such as a cold start valve 57 or a pressure-regulating valve 59. The oil can be pumped by the supply pump 58 to any number of different components of the engine. For example, the oil can be pumped from the supply pump 58 to an oil cooler 51 to shed some of its heat. After cooling down in the oil cooler 51, the oil can next to be sent through an oil filter 53 so that any debris is removed from the oil. From the oil filter 53, the oil can be sent to another component of the gas turbine engine requiring lubrication, such as a gearbox 55, from which oil will be scavenged after having been used. Alternatively, the oil can be sent back to the bearings 52 of the gas turbine engine 8. The flow of oil to the bearings 52 is controlled, in the depicted embodiment, with an oil shut-off valve (OSOV) 20.

The OSOV 20 operates between a shut-off position and a fluid transfer position. In the shut-off position, the OSOV 20 shuts off the flow of oil to the bearings 52 to prevent flooding of the bearing cavities when there is no need to lubricate the bearings 52. In the fluid transfer position, the OSOV 20 allows oil to flow to the bearings 52 to lubricate them when there is a need for lubrication. The OSOV 20 disclosed herein is not actuated by pressurized air, but is instead activated by oil. The expression "activated by oil" refers to the operation of the OSOV 20, in that its operation is governed solely by the pressure of the oil supplied to the OSOV 20, as further explained below. Furthermore, and in contrast to conventional systems, there is no need to separate oil from the pressurized (e.g. "P3") air, or vice versa, because pressurized air is not used to activate the OSOV 20. Oil leakage is also less of a problem because all oil used in the present OSOV 20 returns back into the oil system 50. The pressurized air supply is typically a dead ended cavity, and therefore this line may need to have air flowing therethrough in order to prevent condensation freezing and blocking the line. As a result, a bleed hole may be required. This bleed hole provides an external leak path for the oil, in the event that the seal should fail.

The operation of the OSOV 20 is linked to the speed of rotation of a gas generator (or HP turbine) of the gas turbine engine 8. This speed of rotation is referred to as Ng. This is more clearly understood when considering that the gas generator drives the supply pump 58 of the oil system 50. The supply pump 58 supplies oil at a given oil pressure to the OSOV 20 and to other components needing lubrication. The oil pressure depends on the Ng of the gas generator driving the supply pump 58. Therefore, the pressure of oil supplied to the OSOV 20, and thus the operation of the OSOV 20, is linked to the Ng.

The OSOV 20 disclosed herein is intended to operate at relatively high Ng values because the supply pump 58 operates most efficiently at higher Ng values. For the purposes of explanation, assumed that the OSOV 20 is designed to operate based on two variables: a relatively high Ng value of 15,000 RPM, and a standard main oil temperature (MOT) of 180° F. These are the standard minimum values of the rotational speed of the gas generator, and of the oil temperature, during normal engine operation. The values for Ng and for the MOT are exemplary, and it will be appreciated that other values may be used. These two variables provide oil at an oil pressure of about 60 psig to the OSOV 20. The biasing means within the OSOV 20 can therefore be set to be operational at a threshold oil pressure of about 60 psig. If the pressure of the oil supplied to the OSOV 20 is below 60 psig, the biasing means of the OSOV 20 is not displaced and the OSOV 20 blocks the flow of oil to the bearings 52. This is the shut-off position, where oil is not supplied to the bearings 52 because the Ng value is assumed to be below 15,000 RPM. If the pressure of the oil supplied to the OSOV 20 is greater than 60 psig, the biasing means of the OSOV 20 is displaced and the OSOV 20 allows the flow of oil to the bearings 52. This is the fluid transfer position, where oil is supplied to the bearings 52 because the Ng value is assumed to be above 15,000 RPM.

When the MOT is lower than the assumed standard of 180° F., which may occur during engine start-up and shut-down, the oil pressure will be greater than the threshold oil pressure of 60 psig at Ng values lower than 15,000 RPM. For example, when the MOT is only 50° F., the oil pressure may surpass the threshold oil pressure of 60 psig of the OSOV 20 at an Ng value of only about 10,000 RPM. The bearings 52 may not require lubrication at this engine condition. However, because the pressure of the cooler oil is greater than the threshold oil pressure of 60 psig, oil will be supplied to the bearings 52 by the OSOV 20.

The oil system 50 therefore also includes a compensating valve 30. The compensating valve 30 allows oil to bypass the OSOV 20 and be directed towards the reservoir 56 when the engine component supplied by the OSOV 20 does not require lubrication. As will be discussed in greater detail below, the compensating valve 30 gradually opens an alternate, pressure-reducing oil flow path when the oil pressure entering the OSOV 20 does not correspond to the design conditions of the OSOV 20, thereby allowing the OSOV 20 to operate (i.e. shut-off oil flow and allow oil flow) at its design conditions. The opening of the pressure-reducing oil flow path results in a decrease in the oil pressure applied against the biasing means of the OSOV 20. This decrease in oil pressure provided by the compensating valve 30 compensates for the increase in oil pressure that is due to the colder oil provided to the OSOV 20, for example at engine start-up and shutdown. Viewed in light of the example given above, the compensating valve 30 reduces the oil pressure applied against the biasing means of the OSOV 20 so that it can function at its threshold oil pressure of 60 psig. The compensating valve 30 can therefore be viewed as reducing the pressure of the oil supplied to the OSOV 20.

The compensating valve 30 is fluidly connected to the OSOV 20. The expression "fluidly connected" refers to the relationship between the two valves 20,30 in that oil is supplied to both valves 20,30 simultaneously, and in that the valves 20,30 allow for the exchange of oil between them. For example, and as shown in FIG. 1, the valves 20,30 are separate valves in the same oil system 50 but are in fluid communication via an oil connection line 60. Other configurations of the fluid connection are within the scope of the present disclosure, as discussed in greater detail below. Together, the OSOV 20 and the compensating valve 30 form a valve assembly 10, which is now discussed in greater detail.

Figure 2B:
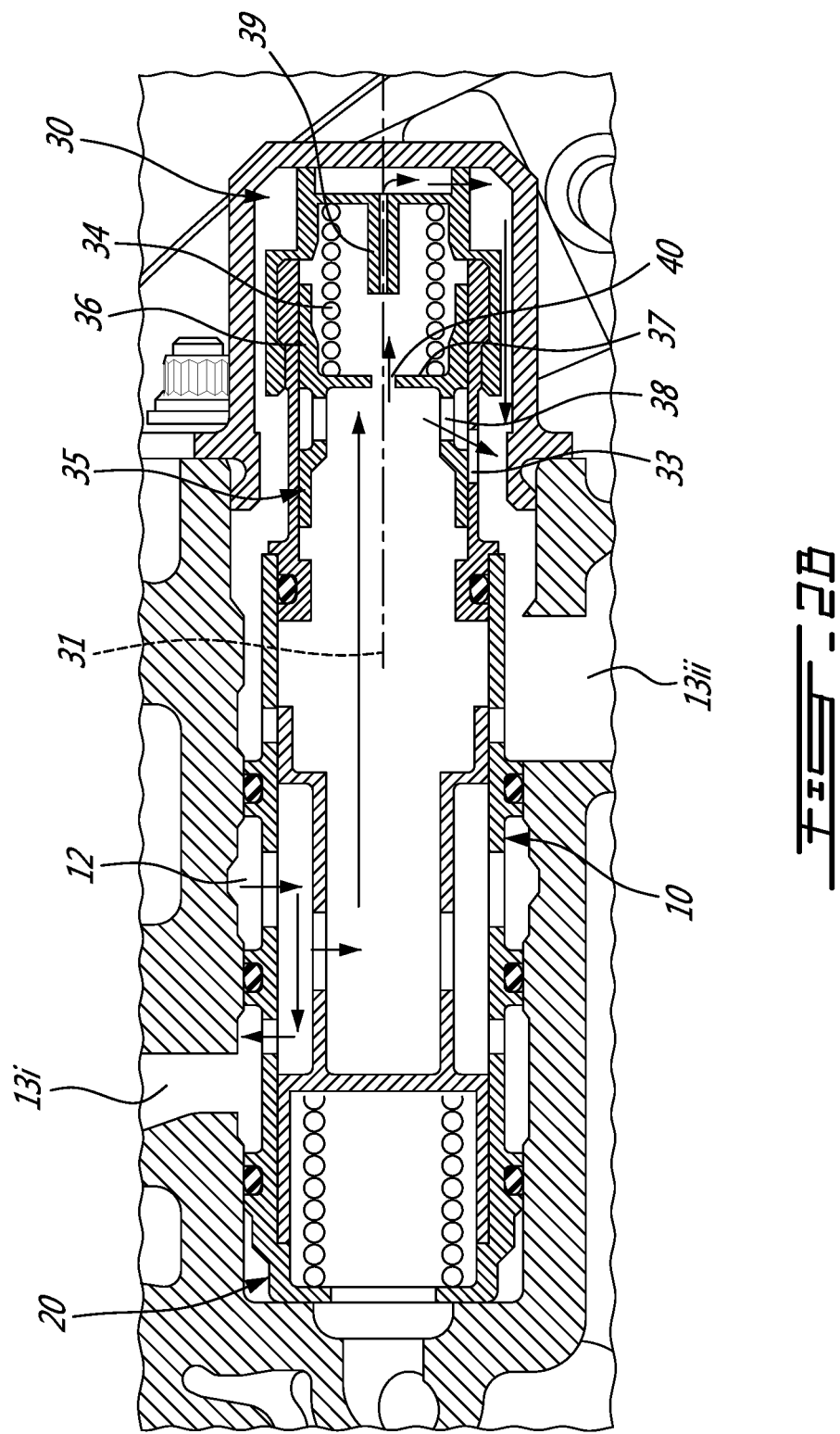
FIG. 2B is another cross sectional view of the valve assembly of FIG. 2A, the oil shut-off valve being shown in a fluid transfer position, and the compensating valve being shown between the open position and a closed position.
Figure 2C:
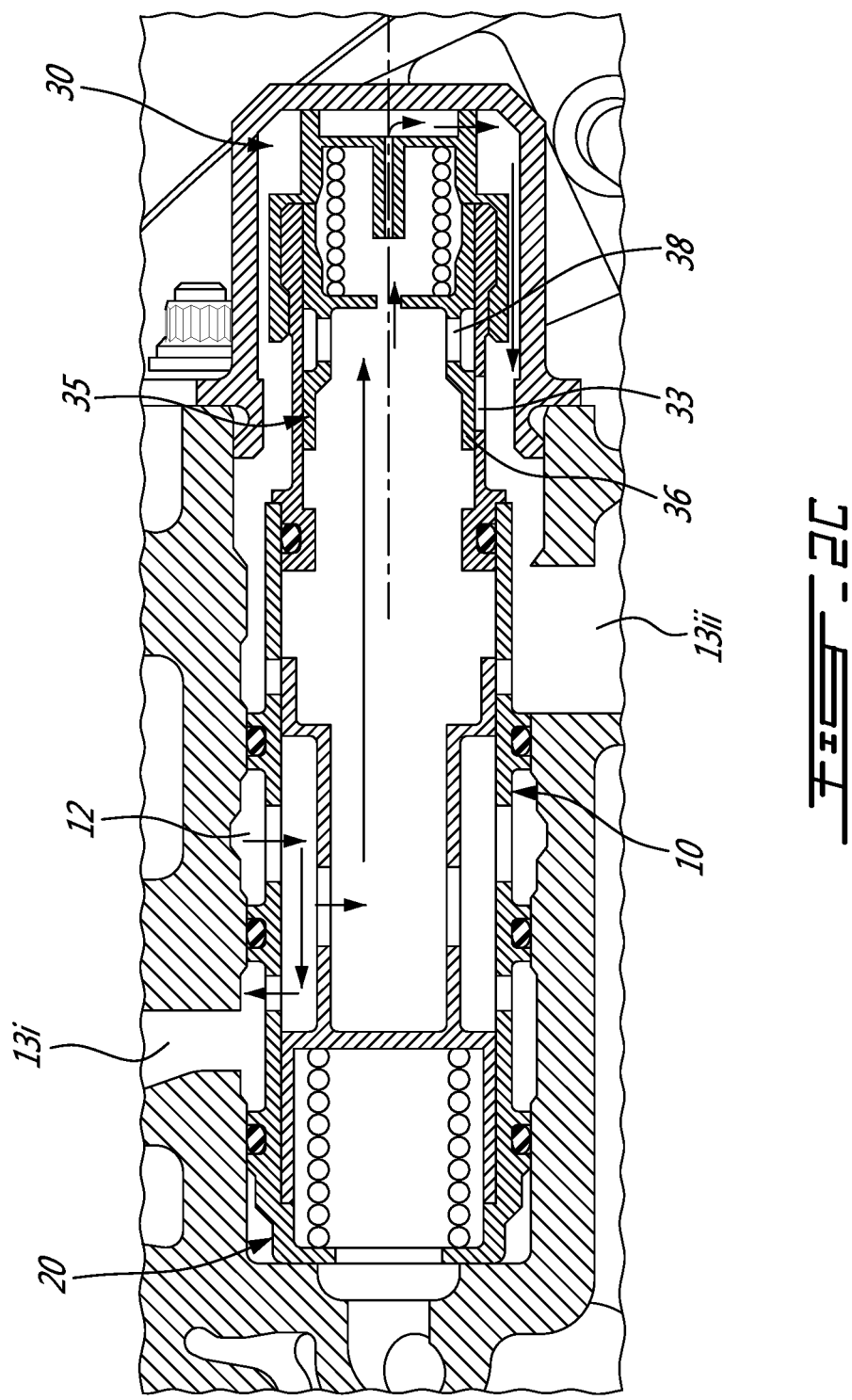
FIG. 2C is yet another cross sectional view of the valve assembly of FIG. 2A, the oil shut-off valve being shown in the fluid transfer position, and the compensating valve being shown in the closed position.

FIGS. 2A to 2C show an embodiment of the valve assembly 10, wherein the valves 20 and 30 are integrated together into a common envelope and disposed within an inner chamber 14 of a common assembly housing 11. The assembly housing 11 has an oil inlet 12 through which oil is supplied from the oil system to the valve assembly 10 in the directions of the arrows shown. The oil inlet 12 supplies both valves 20,30 with oil simultaneously. The valves 20,30 can therefore be said to be in parallel fluid communication. As will be seen, the compensating valve 30 is displaceable between at least first and second positions, in order to reduce the oil pressure experienced by the OSOV when the oil is cold.

The assembly housing 11 also has one or more oil outlets. A first oil outlet 13i directs oil from the valve assembly 10 (more particularly, from the OSOV 20) toward the downstream engine component needing lubrication (e.g. the bearings). A second oil outlet 13ii directs oil from the valve assembly 10 toward the oil reservoir 56.

The compensating valve 30 operates to not vary the pressure of the oil experienced by the OSOV 20 when the compensating valve 30 is in the first position, as shown in FIG. 2C. This may be useful when the engine component needs lubrication. More particularly, the compensating valve 30 is able to maintain the pressure experienced by the OSOV 20 by preventing oil from exiting the valve assembly 10 via the oil outlet 13ii. The oil is therefore forced to exit the valve assembly 10 at the oil outlet 13i via the OSOV 20 along the flow direction shown by the arrows. The compensating valve 30, when in the second position thereof, operates to reduce the oil pressure experienced by the OSOV 20 by opening the alternate pressure-reducing oil flow path toward the oil reservoir 56 via the oil outlet 13ii (as shown in FIG. 2A). The compensating valve 30 includes a housing 32 defining the body of the compensating valve 30, and a piston 35 which is displaced within the housing 32.

The housing 32 or sleeve is an elongated body which forms the corpus of the compensating valve 30. It is generally, but not exclusively, a hollow cylinder. A central axis 31 extends along the length of the housing 32 between both of its ends. The housing 32 has one or more housing apertures 33 which are located along the periphery of the housing 32. Each housing aperture 33 forms an opening or window in the wall of the housing 32 through which oil can exit the interior of the housing 32, to eventually exit the oil outlet 13ii and ultimately reach the oil reservoir 56. The housing apertures 33 therefore reduce the pressure of the oil within the housing 32 by allowing oil to exit the housing 32. In so doing, the housing apertures 33 reduce the pressure of the oil provided to the OSOV 20. As such, the passage of oil through the housing apertures 33 and leading to the oil reservoir 56 forms the pressure-reducing oil flow path discussed above. The number and shape of the housing apertures 33 can vary, as discussed in greater detail below.

The piston 35 is located within the housing 32 and is displaced therein. The displacement of the piston 35 with respect to the housing 32 is based on the properties of the oil entering the compensating valve 30. The oil will therefore displace the piston 35 between an open position and a closed position. In the open position, an example of which is shown in FIG. 2A, the piston 35 is located away from the housing apertures 33 such that they are exposed, thereby allowing oil to exit the compensating valve 30 via the housing apertures 33 toward the oil outlet 13ii. The oil in the open position is therefore directed towards the oil outlet 13ii and the pressure-reducing oil flow path, thereby reducing the oil pressure experienced by the OSOV 20. In the closed position, an example of which is shown in FIG. 2C, the piston 35 obstructs the housing apertures 33 such that it blocks them, thereby preventing oil from exiting the housing apertures 33 and the compensating valve 30. The oil pressure is therefore maintained. The piston 35 can be displaced within the housing 32 in various ways, some of which are now discussed.

A biasing element 34 may be located within the housing 32 and attached to one of the ends of the housing 32. The biasing element 34 is typically a spring, and applies a biasing force to the piston 35 in order to govern the pressure at which the compensating valve 30 is activated. The biasing element 34 is generally pre-loaded with a biasing pressure which is selected based on the environment and operating conditions of the compensating valve 30. The position of the piston 35 within the housing 32 is controlled by a force balance established by feedback pressure operating on the piston 35 on the left hand side of the compensating valve 30, and the force of the biasing element 34 acting on the right-hand side of the compensating valve 30.

The piston 35 and/or housing 32 may have features which create pressure differentials which cause the piston 35 to displace. For example, either one of the piston 35 or housing 32 can have an elongated hole 39 and an orifice 40. The hole 39 and orifice 40 cooperate to provide a pressure differential, or gradient across the piston 35. More particularly, different arrangements and shapes of the hole 39, the orifice 40 can change the pressure across the piston 35, and thus control when the oil pressure displaces the piston 35 between the open and closed positions. It can therefore be appreciated that the elongated hole 39 can be disposed in either one of the housing 32 or the piston 35. The orifice 40 can similarly be located in either one of the housing 32 or piston 35 which does not contain the hole 39. For example, in the compensating valve 30 of FIGS. 2A to 2C, the hole 39 is located in the housing 32 while the orifice 40 is located in the piston 35.

The hole 39 may be referred to as a "laminar" hole 39 because its length, though variable, helps to encourage a laminar flow of oil through the hole 39. Irrespective of where each one is located, the hole 39 and the orifice 40 are disposed within the flow path of oil through the compensating valve 30 and cooperate to function as described herein. In one particular embodiment, each of the hole 39 and the orifice 40 is coaxial with the central axis 31 of the housing 32 (and therefore with each other). However, it is to be understood that the hole 39 and the orifice 40 need not be coaxial. Furthermore, the size, shape, and disposition of the hole 39 and orifice 40 restrict the flow of oil therethrough and thus contribute to a pressure drop generated by the oil as it passes through the hole 39 and orifice 40. The cooperative effect of the hole 39 and orifice 40 allows pressure to build up behind the head of the piston 35, thereby displacing it to the open position and allowing oil to flow out to the reservoir 56. This is particularly true when the oil is cold and viscous. With the hole 39 and the orifice 40, the displacement of the piston 35 is governed by the viscosity of the oil. Such a compensating valve 30 can therefore be referred to as a "viscosity" valve 30.

It should therefore be appreciated that regardless of whether the piston 35 is in the open or closed position, a relatively small amount of oil will flow through the laminar hole 39 and orifice 40 to the oil outlet 13ii along the flow direction indicated by the arrows.

Yet another technique for displacing the piston 35 within the housing 32 involves a thermal compensator. The thermal compensator forms part of the compensating valve 30, and displaces the piston 35 as a function of the temperature of the oil. The thermal compensator can therefore take any suitable form in order to achieve such functionality. For example, the thermal compensator can include a thermal wax element, which expands when the temperature of the oil increases. The expansion of the thermal wax element exerts a pressure against the piston 35, causing it to displace within the housing 32.

Having described at least some of the components of the valve assembly 10, its operation will now be described with reference to FIGS. 2A to 2C. The valve assembly 10 operates between a first configuration and a second configuration.

In the first configuration, an example of which is shown in FIG. 2C, the OSOV 20 is in the fluid transfer position and the piston 35 of the compensating valve 30 is in the closed position. Therefore, the piston 35 is blocking the housing apertures 33 and thus preventing the oil which enters the valve assembly 10 via the inlet 12 from exiting the valve assembly 10 via oil outlet 13ii and the pressure-reducing oil flow path. The pressure of the oil which enters the assembly 10 is therefore substantially maintained. Since the OSOV 20 is in the fluid transfer position, oil can exit the OSOV 20 and be directed to the engine component needing lubrication via the outlet 13i.

In the second configuration, an example of which is shown in FIG. 2A, the OSOV 20 is in the shut-off position and the piston 35 of the compensating valve 30 is in the open position. Therefore, the housing apertures 33 of the compensating valve 30 are exposed, and substantially all the oil which enters the valve assembly 10 via the inlet 12 can exit through the housing apertures 33 and the oil outlet 13ii along the pressure-reducing oil flow path. The pressure of the oil which enters the assembly 10 is therefore reduced, and directed along the alternate pressure-reducing oil flow path.

The valve assembly 10 also operates in a modulating configuration, an example of which is shown in FIG. 2B. The position of the OSOV 20 more closely approximates the fluid transfer position, and the piston 35 of the compensating valve 30 is between the closed and open position. Therefore, the piston 35 only partially blocks the housing apertures 33 and thus allows some of the oil which enters the valve assembly 10 to exit via the housing apertures 33 and the oil outlet 13ii along the pressure-reducing oil flow path. The compensating valve 30 therefore provides some pressure reduction. Some oil can therefore exit the OSOV 20 and be directed to the engine component needing lubrication via the outlet 13i. The modulating configuration is a transition phase, and/or may be suitable when the engine component has a reduced need for lubrication.

It is important to note that in the above-described embodiment, there is no direct operational link between the OSOV 20 and the compensating valve 30. It should therefore be understood that the OSOV 20 and the compensating valve 30 can operate independently of one another. More specifically, the OSOV 20 opens and closes based on the oil pressure to which it is exposed, whereas the compensating valve 30 opens and closes based on the oil viscosity (or more accurately, oil viscosity acting as a surrogate for oil temperature). The compensating valve 30 therefore operates as a viscosity valve by using the oil pressure differential across the valve piston head.

The valve assembly 10 and its valves 20,30 can have many different configurations to achieve the above-described functionality, some of which are now described.

Still referring to FIGS. 2A to 2C, the piston 35 may have a cylindrical piston body 36 and a piston head 37. The piston head 37 helps to limit the flow of oil through the compensating valve 30, and extends radially inward from the piston body 36. More particularly, the piston head 37 can lie in a plane that is perpendicular to the central axis 31 of the housing 32. The orifice 40 in this embodiment is located in the piston head 37 and extends therethrough to allow oil to flow through the piston head 37. The laminar hole 39 is therefore located in the housing 32 at the same end of the housing 32 where the biasing element 34 is attached. The orifice 40 and laminar hole 39 are in serial flow communication, meaning that oil flows through the orifice 40 and then through the laminar hole 39.

The piston body 36 can have one or more piston apertures 38, which are openings in the wall of the piston body 36 that are circumferentially spaced apart from one another about a periphery of the piston body 36. When the piston 35 is in the open position or modulated between the open and closed positions, as shown in FIGS. 2A and 2B, respectively, the piston apertures 38 align with the housing apertures 33 to direct oil through the piston and housing apertures 38,33 and toward the oil reservoir 56, along the direction indicated by the arrows. When the piston 35 is in the closed position, as shown in FIG. 2C, the piston apertures 38 are not aligned with the housing apertures 33. The piston body 36 blocks the housing apertures 33.

Figure 3:
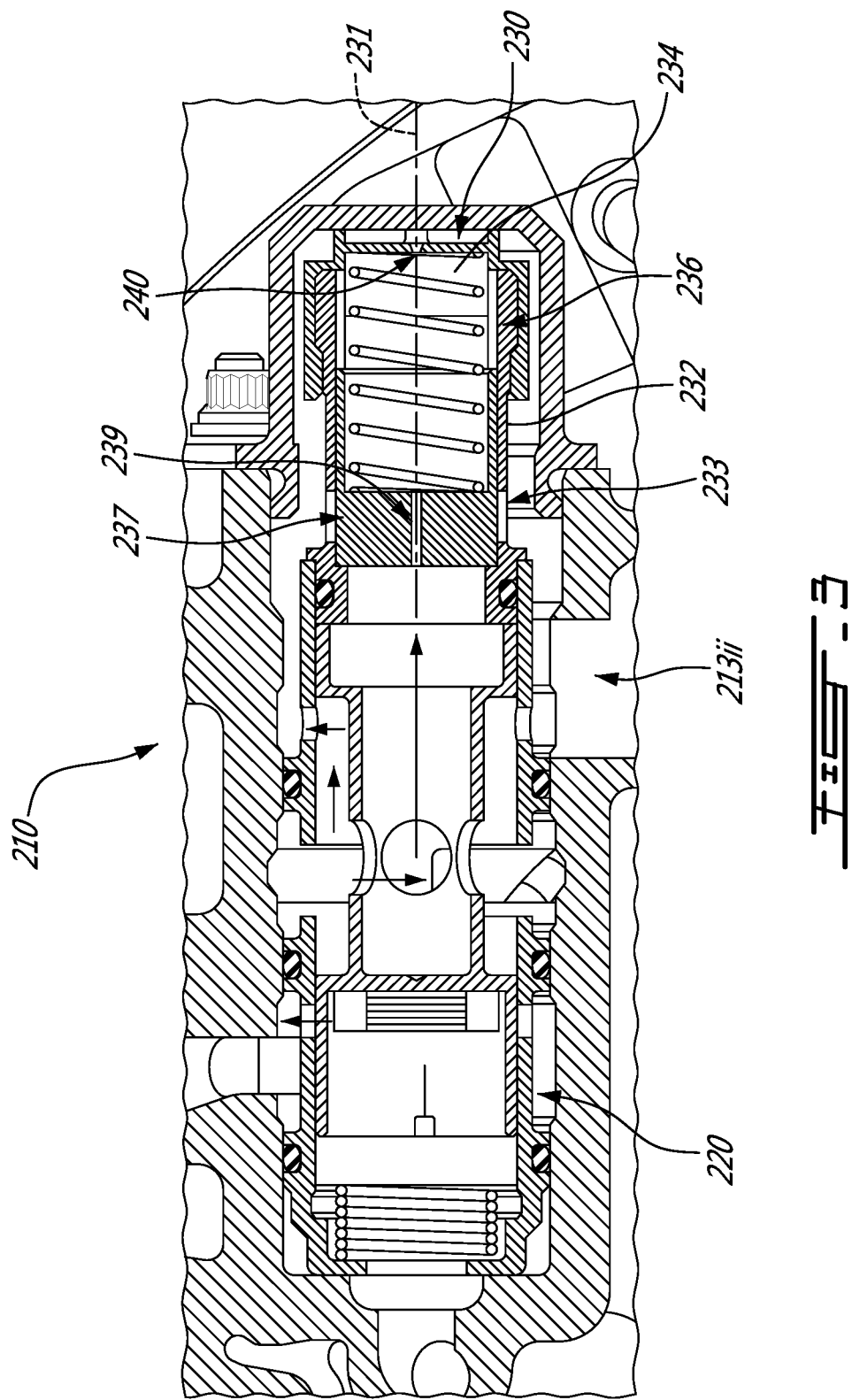
FIG. 3 is a partial sectioned perspective view of a valve assembly, according to yet another embodiment of the present disclosure.

FIG. 3 shows another embodiment of the valve assembly 210. The compensating valve 230 has a piston body 236 and a piston head 237 which is connected to the piston body 236. More particularly, the piston head 237 can lie in a plane that is perpendicular to the central axis 231 of the housing 232. In this embodiment, the orifice 240 is located in the housing 232 at the same end of the housing 232 where the biasing element 234 is attached. The laminar hole 239 is therefore located in the piston head 237 and extends therethrough to allow oil to flow through the piston head 237. The laminar hole 239 and the orifice 240 are in serial flow communication, meaning that oil flows through the laminar hole 239 and then through the orifice 240.

When the piston 235 is in the open position, the piston head 237 exposes the housing apertures 233 to direct oil through the housing apertures 233 and toward the oil reservoir 56 via the oil outlet 213*ii*. It follows that the piston head 237 blocks the housing apertures 233 when the piston 235 is in the closed position.

Figure 4:
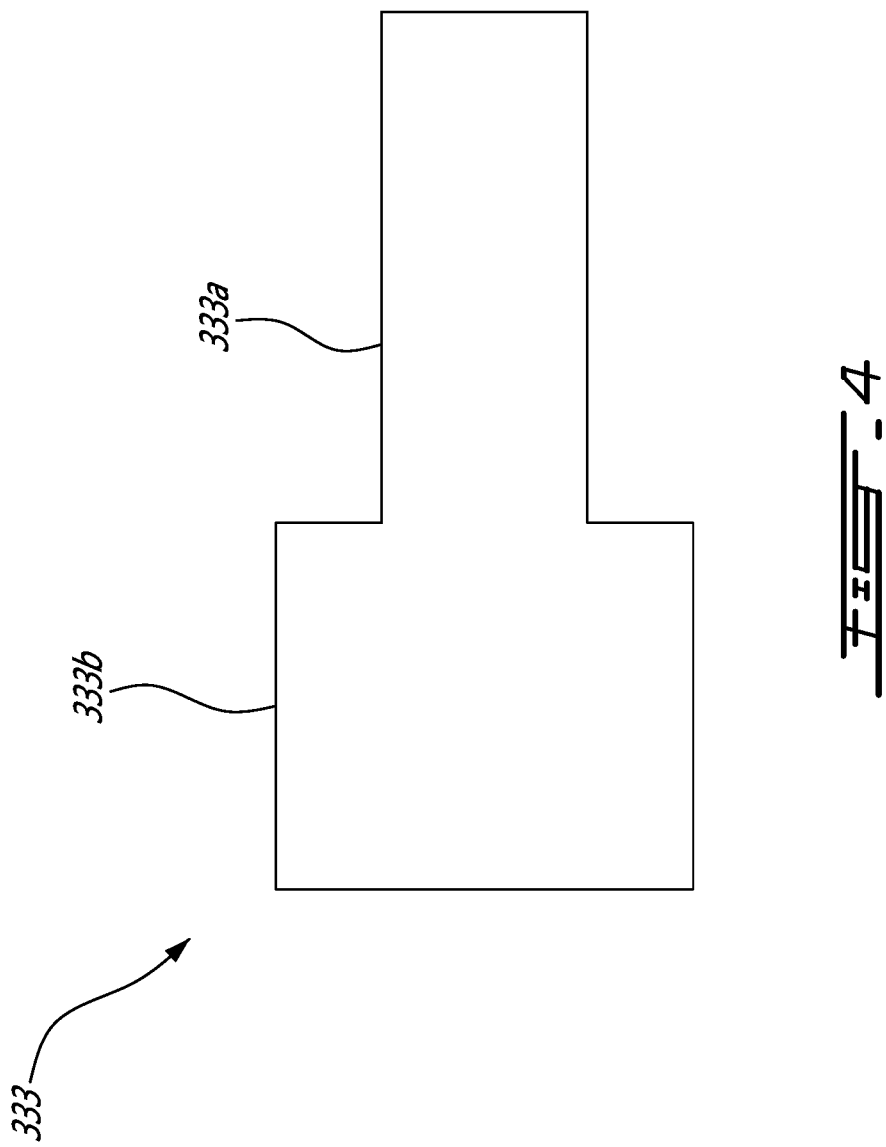
FIG. 4 is a schematic view of a housing aperture of a compensating valve, according to yet another embodiment of the present disclosure.

FIG. 4 schematically illustrates the shape of one of the housing apertures 333 in the housing of the compensating valve. There can be three such housing apertures 333, each one being equally spaced apart from another housing aperture 333 along the periphery of the housing. Each housing aperture 333 has an elongated central portion 333*a* which extends substantially parallel to the central axis of the housing. It also has an elongated cross portion 333*b* which intersects the central portion 333*a* and is transverse to the central portion 333*a*. The housing aperture 333 of FIG. 4 therefore has a "T" shape, and it will be appreciated that other shapes for the housing aperture 333 are also within the scope of the present disclosure. For example, the housing aperture 333 can be shaped like a triangle, or like the letter "D".

Referring again to FIGS. 2A to 2C, there is also disclosed a method of managing a flow of oil to a component of a gas turbine engine.

The method includes conveying the flow of oil simultaneously towards an OSOV 20 and towards a compensating valve 30. The OSOV 20 and the compensating valve are therefore in parallel flow communication. This parallel configuration can be achieved in different ways. For example, the oil can be conveyed towards an oil inlet 12 shared by both the OSOV 20 and the compensating valve 30. Alternatively, the oil can be conveyed towards both the OSOV 20 and the compensating valve 30 via an oil connection line.

The method also includes bypassing the flow of oil from the component by closing the OSOV 20. This directs oil towards an oil reservoir 56, optionally via the compensating valve 30. This can include directing the oil radially away from a central axis 31 of the compensating valve 30 through apertures 33 in the compensating valve 30. The flow of oil can bypass the OSOV 20 under certain engine operating conditions. For instance, the flow of oil can bypass the component when a rotational speed (Ng) of a gas generator of the gas turbine engine is less than about 10,000 RPM. The engine operating condition can also be a property of the oil itself. For example, the engine operating condition can be that the main oil temperature (MOT) is less than about 50° F. (10° C.), which may be the temperature of oil during engine start-up or shutdown, when the need for lubrication is generally reduced. When the MOT is about 50° F. (10° C.), the OSOV 20 will be configured to shut-off the oil flow to the component at an Ng speed of about 10,000 RPM.

The method also includes directing the flow of oil towards the component via the OSOV 20 by closing the compensating valve 30 and opening the OSOV 20. This can include blocking the apertures of the compensating valve 30 so as to substantially maintain the pressure of the oil experienced by the OSOV 20. The OSOV 20 may also have a passage which returns the oil back to the tank. The compensating valve 30 may therefore be used to reduce the oil pressure experienced by the OSOV 20, thereby bringing the OSOV 20 closer to its design operation conditions, for example when the oil is cold, by by-passing more oil back to the tank. The flow of oil can be directed to the component via the OSOV 20 under certain engine operating conditions. For instance, the flow of oil can be directed to the component when a rotational speed (Ng) of the gas generator of the gas turbine engine is greater than about 10,000 RPM. This can also include directing the flow of oil toward the component when the Ng of the gas generator is greater than 20,000 RPM, for all MOT values. This engine operating condition generally corresponds to full engine operation, where there is a steady demand for lubrication. The OSOV 20 may activate during sub-idle operation, in which case the OSOV 20 is open during steady state operation, and idle speed would be the first steady state operating point. The method can also include directing the flow of oil towards both the component and the oil reservoir 56 when the OSOV 20 is between open and closed positions, and when the compensating valve 30 is between open and closed positions. This corresponds to the modulating configuration discussed above.

In light the preceding, it can be appreciated that the combination of the OSOV 20 and the compensating valve 30 assist the OSOV 20 in operating at its optimum design conditions. This allows the oil scavenge pumps to operate more efficiently. More particularly, the housing aperture 33 help to reduce the pressure of the oil supplied to the OSOV 20, thus reduce shut off variations due to oil viscosity effects. Since the compensating valve 30 shifts the shut-off point of the OSOV 20 such that it corresponds more closely to the target Ng, the valve assembly 10 and method disclosed herein provide a means for ensuring a more precise termination of the oil flow as a function of a given target Ng.

The above description is meant to be exemplary only, and one skilled in the art will recognize that changes may be made to the embodiments described without departing from the scope of the invention disclosed. For example, although the valve assembly and method disclosed herein is described as being oil-activated, it will be appreciated that it can be activated by, and used with, other fluids, such as fuel, for example. Therefore, the terms "oil", "lubricant", etc. should not be understood as limiting the valve assembly and method to being used exclusively with oil or other lubricants. Still other modifications which fall within the scope of the present invention will be apparent to those skilled in the art, in light of a review of this disclosure, and such modifications are intended to fall within the appended claims.

The invention claimed is:

1. A method of managing a flow of oil to a component of a gas turbine engine, comprising:
   conveying the flow of oil from an oil supply pump simultaneously towards an oil shut-off valve and a compensating valve, the oil shut-off valve and the compensating valve being upstream of a bearing cavity;
   bypassing the flow of oil from the component by at least closing the oil shut-off valve to direct oil towards an oil reservoir via the compensating valve;
   directing the flow of oil towards the component via the oil shut-off valve by closing the compensating valve and opening the oil shut-off valve;
   wherein the oil shut-off valve is operated as a function of oil pressure produced by the supply pump which is generated by a rotational speed of a gas generator of the gas turbine engine; and
   the compensating valve is operated independently of the oil-shut off valve as a function of a viscosity of the oil, the compensating valve including a laminar hole and an orifice which operate to make the compensating valve sensitive to oil temperature, the laminar hole extending through one of a piston and a housing of the compensating valve, and the orifice extending through the other one of the piston and the housing, the laminar hole and the orifice creating a pressure gradient across the piston to displace the piston, the laminar hole extending through the housing at the same end thereof as a biasing element acting against the piston of the compensating valve, the laminar hole and the orifice being in serial flow communication.

2. The method of claim 1, wherein bypassing the flow of oil includes opening the compensating valve.

3. The method of claim 1, wherein bypassing the flow of oil includes directing the oil radially away from a central axis of the compensating valve through apertures in the compensating valve, when the rotational speed of the gas generator of the gas turbine engine is less than 10,000 RPM.

4. The method of claim 1, wherein directing the flow of oil towards the component includes blocking apertures of the compensating valve, when the rotational speed of the gas generator of the gas turbine engine is greater than 10,000 RPM.

5. The method of claim 1, further comprising directing the flow of oil towards both the component and the oil reservoir when the oil shut-off valve is between open and closed positions, and when the compensating valve is between open and closed positions.

6. The method of claim 1, wherein directing the flow of oil towards the component further includes using the compensating valve to reduce a pressure of the oil provided to the oil shut-off valve.

\* \* \* \* \*